UNITED STATES PATENT OFFICE.

WILLIAM F. WHEELER, OF PHILADELPHIA, PENNSYLVANIA.

COMPOUND FOR DISINFECTION.

SPECIFICATION forming part of Letters Patent No. 224,367, dated February 10, 1880.

Application filed May 5, 1879.

*To all whom it may concern:*

Be it known that I, WILLIAM F. WHEELER, of the city and county of Philadelphia, and State of Pennsylvania, have invented a new and useful Improvement in Holders for Disinfectants, &c., which improvement is fully set forth in the following specification.

My invention consists of calcined gypsum as a holder for a disinfecting or deodorizing material, preferably carbolic acid, whereby, when the gypsum is exposed to the air, said agent or agents evaporate from the same.

The agent or agents may be solid, liquid, or gaseous, and introduced into the calcined gypsum in its dry powdered state, after which the mass is set or molded into any desired shape; or the gypsum may be molded, and the block or shape as formed saturated with or immersed in the fluid agent, so that it absorbs the latter.

It will be seen that when the blocks or forms as produced or treated are exposed to the air the agents evaporate, or may be burned from the same. The blocks or forms may be placed in water, so as to impregnate it by the extraction of the agent or agents.

Owing to the affinity of water for calcined gypsum, moisture of the atmosphere is absorbed, and the agent united with the gypsum is displaced thereby, wherefore the evaporation of the agent ensues, especially when the latter is carbolic acid.

Having thus described my invention, what I claim as new, and desire to secure by Letters Patent, is—

A solid and absorbing brick composed of a disinfecting or deodorizing material, as described, combined with calcined gypsum or plaster-of-paris, and solidified, as and for the purpose set forth.

W. F. WHEELER.

Witnesses:
JOHN A. WIEDERSHEIM,
JNO. A. BELL.